S. MASUMOTO.
AUTOMOBILE TRAFFIC SIGNAL.
APPLICATION FILED DEC. 11, 1919.
1,348,367.
Patented Aug. 3, 1920.
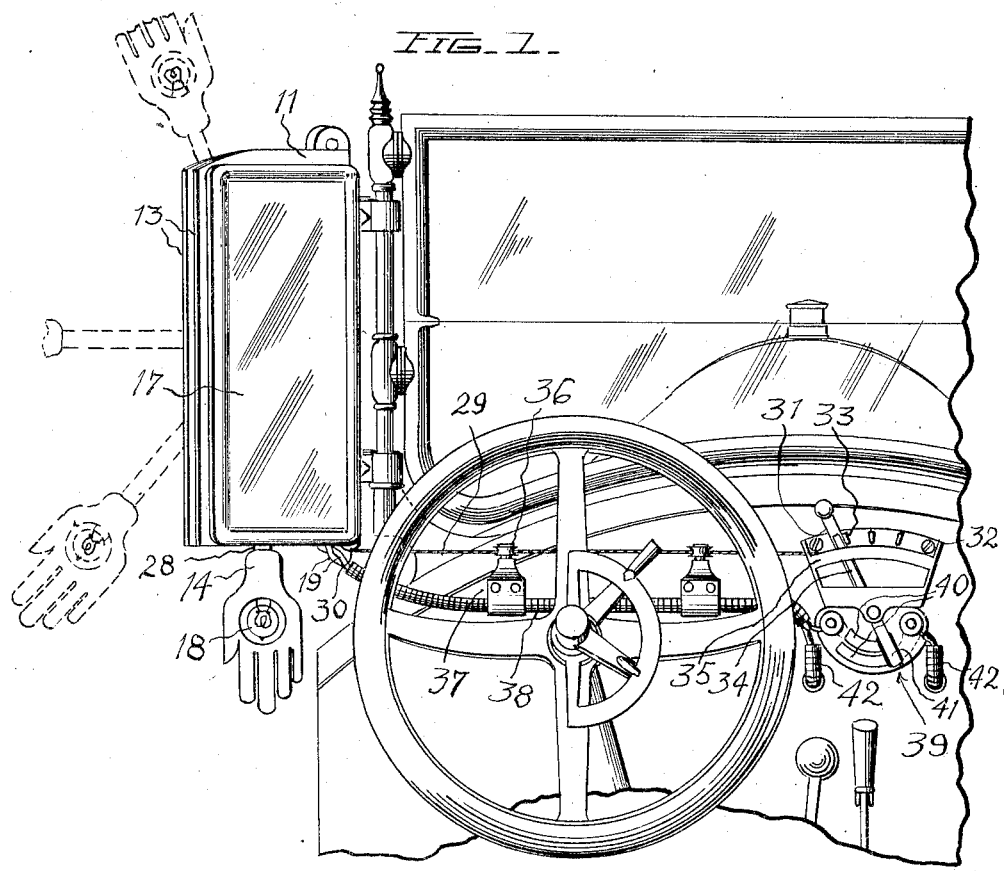
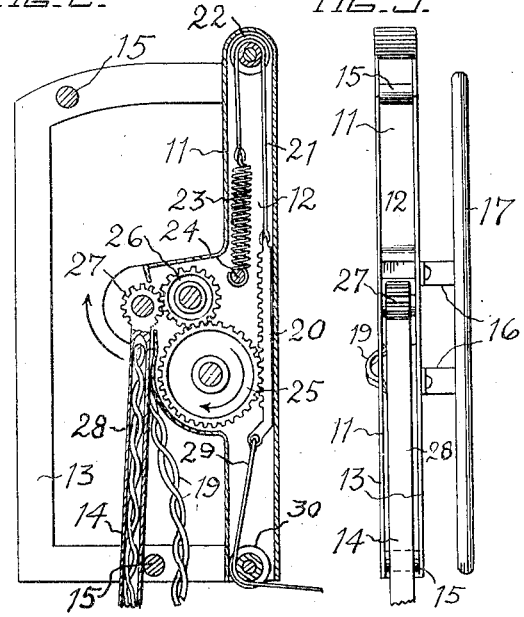
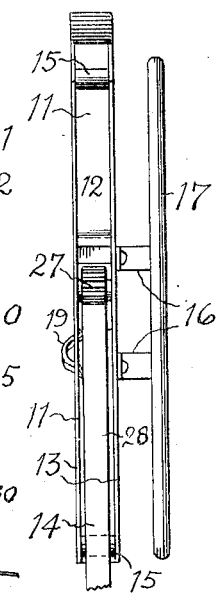
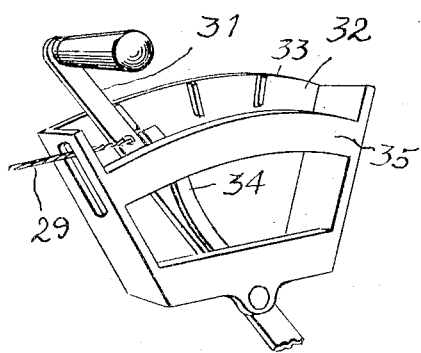
INVENTOR:
Shigeru Masumoto.
By His Attorney:
Edward M. Kojima

UNITED STATES PATENT OFFICE.

SHIGERU MASUMOTO, OF LOS ANGELES, CALIFORNIA.

AUTOMOBILE TRAFFIC-SIGNAL.

1,348,367.　　　　　Specification of Letters Patent.　　Patented Aug. 3, 1920.

Application filed December 11, 1919. Serial No. 344,047.

*To all whom it may concern:*

Be it known that I, SHIGERU MASUMOTO, a subject of the Emperor of Japan, residing at Los Angeles, in the county of Los Angeles and State of California, have invented a new and useful Automobile Traffic-Signal, of which the following is a specification.

This invention relates to signals for vehicles, and particularly to a signal whereby the operator or driver of an automobile may indicate to the drivers of approaching machines, the direction in which he is about to turn.

A further object of this invention is the provision of a signal for automobiles which includes an illuminated semaphore whereby the operation of the signal will indicate to following and approaching machines, the direction in which the driver intends to turn when traveling at night time or on a dark day.

A further object of this invention is the provision of a signal which consists of comparatively few parts and which is simple in construction, durable and well adapted to withstand the rough usage to which automobile signal devices are ordinarily subjected.

A further object of this invention is to provide a signaling mechanism of the character stated which can be installed at a relatively low price, and without altering the automobile or vehicle to which the device may be attached.

With these and other objects in view, the invention consists in the novel features of construction, combination and arrangement of parts as will be more fully hereinafter described and pointed out in the claim.

Upon the annexed drawings, Figure 1 is an end elevation of a signal device embodying my invention. Fig. 2 is a rear elevation showing the device attached to a wind-shield. Fig. 3 is a vertical sectional view of the device. Fig. 4 is a perspective view of the operative and control lever.

Referring to the drawings, the signal casing 11, may be mounted upon the automobile in any desired manner and at any desired point, but in the preferred form as herein illustrated, it is deemed best to mount the signal on the edge of the wind-shield and in the position usually occupied by the side mirrors and wind deflectors. The casing consists of an inclosed portion 12, and the oppositely disposed guides 13, between which the semaphore 14, swings. The arc of movement of the semaphore 14, is determined by the stop-pins 15, which serve to hold the guides in a spaced apart position. Transversely extending braces 16, serve to support a wind-deflector and mirror 17. The semaphore has mounted therein at its free end, an electric light bulb 18, which has the circuit conduits 19, connected thereto. Within the inclosed casing 12, is mounted a reciprocating rack member 20. A cable 21, having one end secured to the rack member, passes over a pulley 22 at the top of the casing, and has the opposite end secured to a spring 23, the opposite end of the spring being secured to a bolt 24 within the casing. The rack member 20 engages with a gear 25, which, through a counter-gear 26, serves to drive the pinion 27 forming the end of the shaft 28, on which the semaphore signal is mounted.

Means for actuating the rack member 20, consist of a cable 29 secured to the lower end of the rack member, and passing over a pulley 30, at the bottom of the inclosed casing 12, and thence to a lever 31, mounted on the dial 32. Projections 33, serve to determine the operative positions of the lever 31, and a spring 34, secured to lever 31, and bearing against the brace 35, serves to maintain the lever in its operative positions.

The cord or cable 29, passes over pulleys 36, mounted on brackets 37. The circuit conductors 19, pass through a conduit 38 supported by brackets 37. A switch 39, included in the circuit, consists of contact members 40, adapted to be bridged by a contact member 41, carried by lever 31, and the arrangement is such that the bulb 18, may be energized whenever the signal is moved from the neutral or non-display position, thereby causing the semaphore to be illuminated in the operative positions. The terminals 42, represent any suitable system of wiring adapted to energize the electric bulb.

In use, the signal is placed in the several display positions by operating the lever 31, suitably located at the right of the steering wheel, for manipulation. The neutral position is indicated in Fig. 1, in full lines. The downwardly inclined position will indicate that the vehicle is about to stop, or if standing, to back up, the horizontal position will indicate that the vehicle is about to turn to the left, and the upwardly inclined position will indicate a turn to the right.

From the foregoing it may be seen that I have provided signal apparatus which is compact, economical to operate, and comparatively cheap to construct, the invention not being limited to the exact construction shown, but may be varied within the scope of the claim.

What is claimed is:

In a vehicle signal, the combination with a casing, of guide members integral with the casing, an arm pivotally mounted within the casing and adapted to swing between said guides, a signal blade disposed on the outer end of said arm, stop-pins holding the guide members in a spaced apart position and limiting the swinging movement of the arm, a pinion member integral with and forming the inner end of the arm, a train of gears mounted within the casing and adapted to operate the pinion member, a rack member to operate the train of gears and disposed longitudinally within the casing, a pin extending transversely within the casing, a pulley at the top of the casing, a coil spring having one end connected to one of the transverse pins, a cable passing over the pulley and having one extremity connected to the spring and the other extremity connected to the rack member, and means for operating the rack member with a reciprocating movement.

In testimony whereof, I hereunto affix my signature this 29th day of November, 1919.

SHIGERU MASUMOTO.